United States Patent [19]

Broome

[11] Patent Number: 5,443,306
[45] Date of Patent: Aug. 22, 1995

[54] ELECTROHYDRAULIC BRAKE CONTROL SYSTEM

[75] Inventor: William S. Broome, Inkberrow, United Kingdom

[73] Assignee: Grau Limited, Redditch, United Kingdom

[21] Appl. No.: 93,267

[22] Filed: Jul. 19, 1993

[30] Foreign Application Priority Data

Jul. 22, 1992 [GB] United Kingdom ............... 9215510

[51] Int. Cl.⁶ .................... B60T 13/66; B60T 8/36
[52] U.S. Cl. ............................. 303/3; 303/15; 303/113.4; 303/118.1; 303/DIG. 4
[58] Field of Search ....... 303/118.1, DIG. 3, DIG. 4, 303/119.2, 113.4, 3, 15, 9, 92

[56] References Cited

U.S. PATENT DOCUMENTS

| | | | |
|---|---|---|---|
| 3,874,744 | 4/1975 | Huber | 303/118.1 |
| 3,881,779 | 5/1975 | Machek | 303/118.1 |
| 4,576,416 | 3/1986 | Müller et al. | 303/118.1 |
| 4,585,278 | 4/1986 | Grauel et al. | 303/7 |
| 4,616,881 | 10/1986 | Müller et al. | 303/7 |
| 4,685,745 | 8/1987 | Reinecke | 303/DIG. 3 |
| 4,708,225 | 11/1987 | Feldman et al. | 303/DIG. 4 |
| 4,850,650 | 7/1989 | Eckert et al. | 303/100 |
| 4,861,115 | 8/1989 | Petersen | 303/DIG. 4 |
| 5,004,299 | 4/1991 | Brearley et al. | 303/DIG. 4 |
| 5,022,717 | 6/1991 | Heibel et al. | 303/119.2 |
| 5,040,853 | 8/1991 | Burgdorf et al. | 303/119.2 |
| 5,100,208 | 3/1992 | Angermair | 303/118.1 |

FOREIGN PATENT DOCUMENTS

| | | |
|---|---|---|
| 0477519 | 4/1992 | European Pat. Off. ...... 303/DIG. 4 |
| 0477519A1 | 4/1992 | European Pat. Off. . |
| 2053394 | 2/1981 | United Kingdom . |
| 2125915 | 3/1984 | United Kingdom . |
| 2129079 | 5/1984 | United Kingdom . |
| 2196710 | 5/1988 | United Kingdom . |

Primary Examiner—Matthew C. Graham
Attorney, Agent, or Firm—Leydig, Voit & Mayer, Ltd.

[57] ABSTRACT

An electronically controlled braking system having a driver operated control 11 for providing an electrical braking demand signal and a fluid pressure back-up supply; an electronic control 10, 139 is responsive to the electrical braking demand signal, and brake valves 12, 13, 14, 15 are responsive to an instructing signal supplied to the brake valves by the electronic control 10, 139 to control supply of fluid under pressure from a source 20 to at least one actuator 16, 17, 18, 19 for brake application. The fluid pressure back-up supply is also fed to the brake valve and a shuttle valve 134 is provided to feed the back-up supply to the actuator 16, 17, 18, 19 if the electronic control 10, 139 fails.

18 Claims, 3 Drawing Sheets

ELECTROHYDRAULIC BRAKE CONTROL SYSTEM

BACKGROUND TO THE INVENTION

This invention relates to an electronically controlled braking system for a vehicle.

Requirements for controlling the brakes of vehicles, particularly of heavy duty commercial vehicles, have become increasingly complex over recent years. One such requirement is that of providing an anti-lock braking system (ABS), in which incipient locking of one or more braked wheels is detected and the braking level controlled to avoid such locking. Another requirement may be that of traction control under difficult road conditions. Hitherto the control mechanism for braking systems on heavy duty vehicles has generally been based on pneumatic control, where the medium which powers the brakes is air under pressure, but the increasingly complex requirements for brake control lead to the adoption of an electronically controlled system. It is the object of the present invention to provide improvements in an electronically controlled braking system.

SUMMARY OF THE INVENTION

According to one aspect of the present invention we provide an electronically controlled braking system comprising means operable by a driver of a vehicle for providing an electrical braking demand signal; electronic control means responsive to said braking demand signal, and brake valve means responsive to an instructing signal supplied to it by the electronic control means and arranged to control supply of fluid under pressure from a source thereof to at least one actuator means for brake application.

The driver-operable means of the system may include, as well as means for providing said braking demand electrical signal, means for supplying fluid under pressure to the brake valve means of the system. Such means may be arranged to come into operation in the event of any failure of the electronic control means or other electrical or electronic part of the system, and may operate in conventional manner, the fluid thus supplied from the driver operated means being applied to the inlets of the brake valves which provide for direct supply of fluid to the brake actuators.

Preferably the brake valve means comprises a plurality of brake valves, arranged to control the supply of fluid under pressure to a respective brake actuator means for a wheel of the vehicle.

Each brake valve may include pressure sensing means to supply a signal responsive to the pressure of the fluid supplied to the associated brake actuator means; electrically operable valve means for controlling the supply of fluid under pressure from the source thereof to the actuator or actuators; and the electronic control means receiving the signal supplied by the pressure sensing means and being arranged to control said electrically operable valve means so that said pressure is in accordance with the instructing signal.

Said electronic control means may comprise a main data processing means and an EBS data processing means being spatially associated with each brake valve, the main data processing means receiving the brake demand signal from the driver operable means and transmitting said instructing signal to each EBS data processing means, each EBS data processing means receiving the signal supplied by the associated pressure sensing means and being arranged to effect said control of said electrically operated valve means so that said pressure is in accordance with the instructing signal.

Preferably the EBS data processing means of the brake valves are connected in a data bus network with the main data processing means of the system.

Each brake valve preferably, in addition to providing for supply of fluid under pressure from the source thereof to the associated brake actuator means under the control of the electrically operable valve means, also has an inlet for fluid under pressure to be supplied directly to the associated brake actuator means. Preferably each brake valve has a blocking valve member, operable automatically in response to fluid pressure so as to assume either a first position in which it opens a first passage for supply of fluid by way of the electrically operable valve means to the brake actuator(s) and closes a second passage from said inlet for direct supply of fluid, and a second condition in which it closes the first passage and opens the second passage.

Preferably the pressure sensing means of the brake valve is positioned so as to detect the pressure of fluid supplied to the brake actuator means whichever position the blocking valve member is in. This renders it possible to provide a testing facility as described hereafter.

By virtue of the blocking valve members provided in the brake valves, fluid under pressure thus supplied from the driver-operable means is applied directly to the brake actuators associated with the brake valves.

The driver-operable means may further include means for supplying fluid under pressure directly to the brake valves in response to an electrical signal which may be given by the electronic control means and constitute a test signal. When the fluid is thus supplied to the brake valves in response to the test signal, this may be detected by a pressure sensing means thereof, which provide signals to the electronic control means as an indication of a satisfactory test result. The electronic control means may be arranged to provide such a test signal each time the electrical circuits of the vehicle are activated after a period of non-use (e.g. each time the "ignition" of the vehicle is switched on prior to start-up of the vehicle).

Preferably the fluid is air.

In addition to the braking demand signal provided by the driver-operable means, the electronic control means may also be responsive to signals provided by sensors detecting other operating parameters associated with the vehicle. For example, sensors may detect wheel speed, brake temperature, and such sensors may be associated with each wheel. The signals provided by wheel speed sensors enable rate of change of wheel speed to be calculated, and thus incipient wheel locking to be detected and an anti-locking function provided. Electrical signals from such sensors may be applied to the EBS data processing means incorporated in the associated brake valve and thence be communicated to the main data processing means by way of the data bus network. Further sensors may be provided for sensing further parameters which may include, for example, vehicle load, which may be represented as a pressure signal derived from the bellows of air suspension or air assisted suspension.

The pressure sensing means may be mounted on a printed circuit board or other mounting means, spatially associated with an associated brake valve.

A seal may be provided between said fluid supplied to the brake actuator means and at least one of the pressure sensing means and the mounting means.

The seal may comprise a membrane disposed between the mounting means and a wall of a passage for said air and extending over the pressure sensing means.

According to another aspect of the present invention, we provide a brake valve for an electronically controlled braking system, comprising a first inlet for receiving fluid under pressure from a source thereof; an outlet for supply of the fluid to at least one brake actuator, electrically operable valve means for controlling delivery of the fluid from said first inlet to said outlet; a second inlet for receiving fluid from a further source thereof and arranged to deliver such fluid direct to said outlet bi-passing said electrically operable valve means; and pressure sensing means responsive to the pressure of fluid delivered to said outlet irrespective of the source of such fluid.

Preferably a blocking valve member is provided, operable automatically in response to fluid pressure so as to assume either a first position in which it opens a first passage for supply of fluid from the first inlet by way of the electrically operable valve means to the brake actuator(s) and closes a second passage from said second inlet for said direct supply of fluid, and a second condition in which it closes the first passage and opens the second passage.

BRIEF DESCRIPTION OF THE DRAWINGS

The invention will now be described by way of example with reference to the accompanying drawings, of which.

DESCRIPTION OF THE PREFERRED EMBODIMENTS

Figure 1:
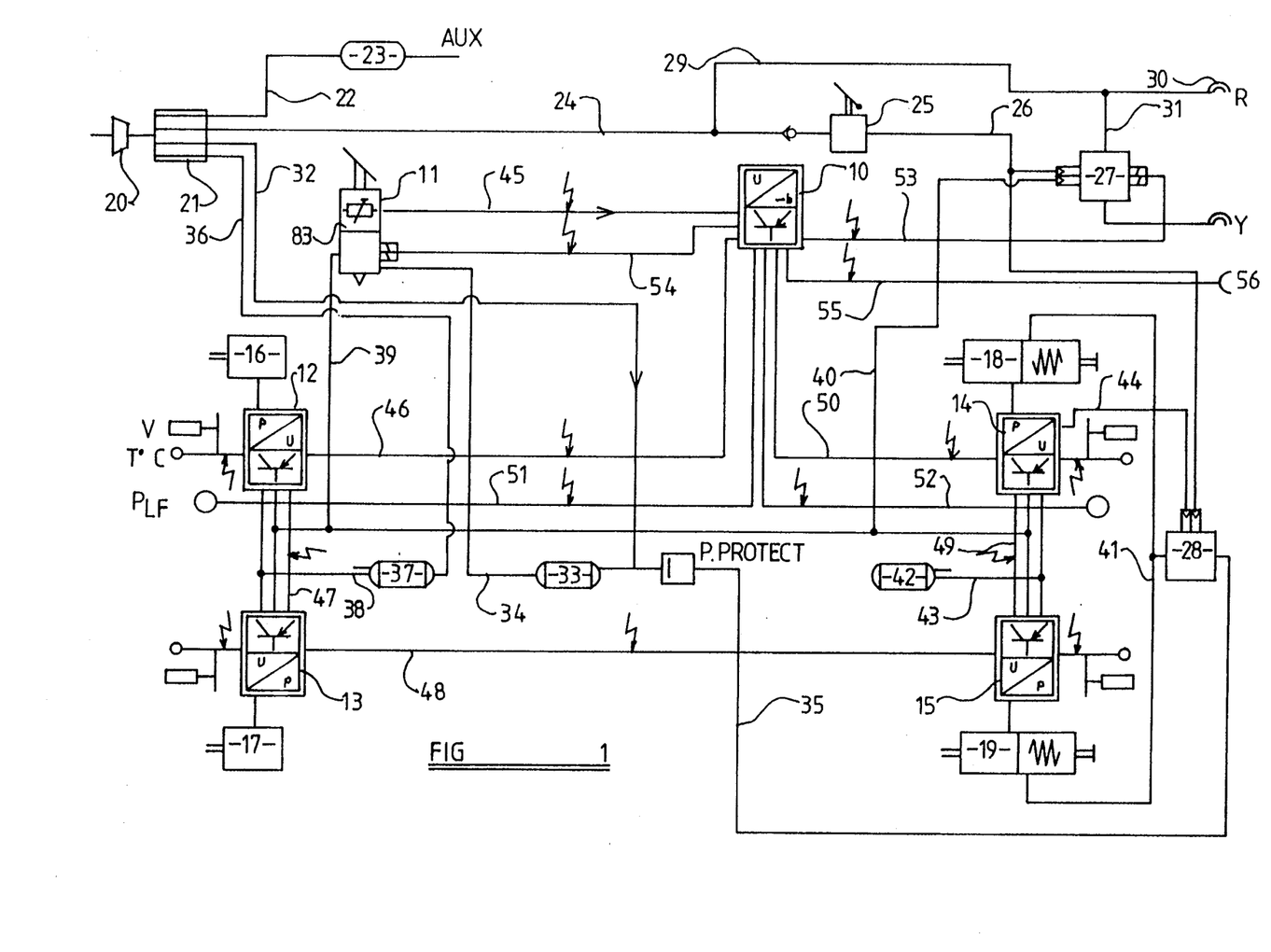
FIG. 1 is a diagram showing the main components of an electronically controlled braking system for a vehicle, and the electrical and fluid connections therebetween.

Referring firstly to FIG. 1 of the drawings, this shows diagrammatically an electronically controlled braking system for a motor vehicle. The vehicle typically is a heavy truck which may tow a trailer, or a tractor unit for attachment to a trailer or semi-trailer. The system comprises a number of main components as described hereafter, with electrical connections therebetween in a data bus arrangement, certain of the main components of the system incorporating data processing means operable as described hereafter. In FIG. 1, electrical connections in the data bus arrangement are indicated by lines to which the symbol ⋈ is applied. The system makes use of air under pressure as the operating fluid, and pipes for transmission of such air are indicated by the other lines described hereafter.

In FIG. 1, the main components of the electronically controlled braking system are a main electronic control unit (ECU) 10, provided with suitable main data processing means such as a microprocessor, a drivers foot-operable brake valve (hereinafter termed for brevity the foot valve) 11, and integrated electronically controlled brake valves 12, 13, 14, 15 (hereinafter termed EBS valves). The EBS valves 12, 13 control supply of air to brake actuators 16, 17 of the front wheels of the vehicle. The EBS valves 14, 15 control the supply of air to brake actuators 18, 19 at the rear wheels of the vehicle.

The system is supplied with air under pressure from a compressor 20 by way of a four circuit protection valve 21 which distributes the air to four outlets. The first outlet, line 22, leads to a reservoir 23 for air supply to auxiliary air-operated systems of the vehicle. The second outlet, line 24, provides air to a parking brake valve 25 operable by a driver of the vehicle. The parking brake valve 25 is further connected, by a line 26, to a trailer valve 27 and an anti-compounding valve 28. The output on line 24 from valve 21 is also connected, by a line 29, to a trailer connection socket 30 and on line 31 to the trailer valve 27.

The third outlet from the valve 21, line 32, leads to a reservoir 33 which provides air on lines 34, 35, respectively, to the foot valve 11 and to the anti-compounding valve 28.

The fourth outlet from the valve 21, line 36, leads to a reservoir 37 and thence by way of line 38 to the EBS valves 12, 13 for the front wheels of the vehicle. There is also a line 38a, not shown, to a further reservoir 42 for the EBS valves for the rear wheels of the vehicle.

From the foot valve 11 a line 39 provides for supply of back-up air to both the EBS valves 12, 13 for and spatially adjacent to the front wheels of the vehicle and to the EBS valves 14, 15 for and spatially adjacent to the rear wheels of the vehicle. A line 40 branches from the line leading to the EBS valves at the rear wheels of the vehicle to provide for supply of back-up air to the trailer valve 27.

The anti-compounding valve 28 provides for supply of air, by line 41, to the brake actuators 18, 19 at the rear wheels of the vehicle. These brake actuators have associated therewith a parking brake actuator which is spring applied, and released and held off by the supply and maintenance of air under pressure thereto. The EBS valves 14, 15 receive air under pressure, on line 43, from the reservoir 42, and provide for controlled supply of air to the brake actuators 18, 19 to apply the brakes on the rear wheels. The anti-compounding valve 28 receives, on line 44, air from the EBS valve 14 when that valve is applying air to the actuator 18 for brake actuation, and the function of the anti-compounding valve is to ensure that normal brake application is not affected by the spring force of the spring parking brake device and the air supply thereto to hold the parking brake off.

The main electronic control unit 10 comprises a main data processing means and receives and processes electronic signals, via the data bus network, from various sources. It receives, on line 45, an electrical braking demand signal from the foot valve 11 operated by the driver of the vehicle and outputs a brake instructing signal representing the desired level of service braking as represented by the pressure applied by the driver to the brake pedal.

Each of the wheels has associated therewith a wheel speed sensor represented as V, and a brake temperature sensor represented as T° C., the signals from such sensors being transmitted to data processing means in the associated EBS valves 12, 13, 14 or 15 (hereinafter referred to as "EBS data processing means". The EBS data processing means of the four EBS valves are connected in the data bus network by lines 46, 47, 48, 49, 50 to one another and to the main data processing means provided by the ECU 10. Such lines provide for transmission of signals in both directions between the EBS valves and the ECU 10. Vehicle load sensors PLF at the front and PLR at the rear of the vehicle are connected by lines 51, 52 to the control unit 10, such sensors working, for example, from the pressure prevailing in the bellows of air suspension for front and rear axles of the vehicle. Further data bus network connections between the main ECU and the trailer valve 27 and the foot valve 11 are provided by way of lines 53, 54 respectively, the latter being for transmission of a test signal as described hereafter. A further line 55 from the ECU 10 leads to a socket 56 for possible connection to electronics associated with trailer brakes.

Other inputs may be provided as desired either to the data processing means of the EBS valves or directly to the ECU. For example, a signal for a decelerometer sensing deceleration of the vehicle may be supplied directly to the ECU.

Figure 2:
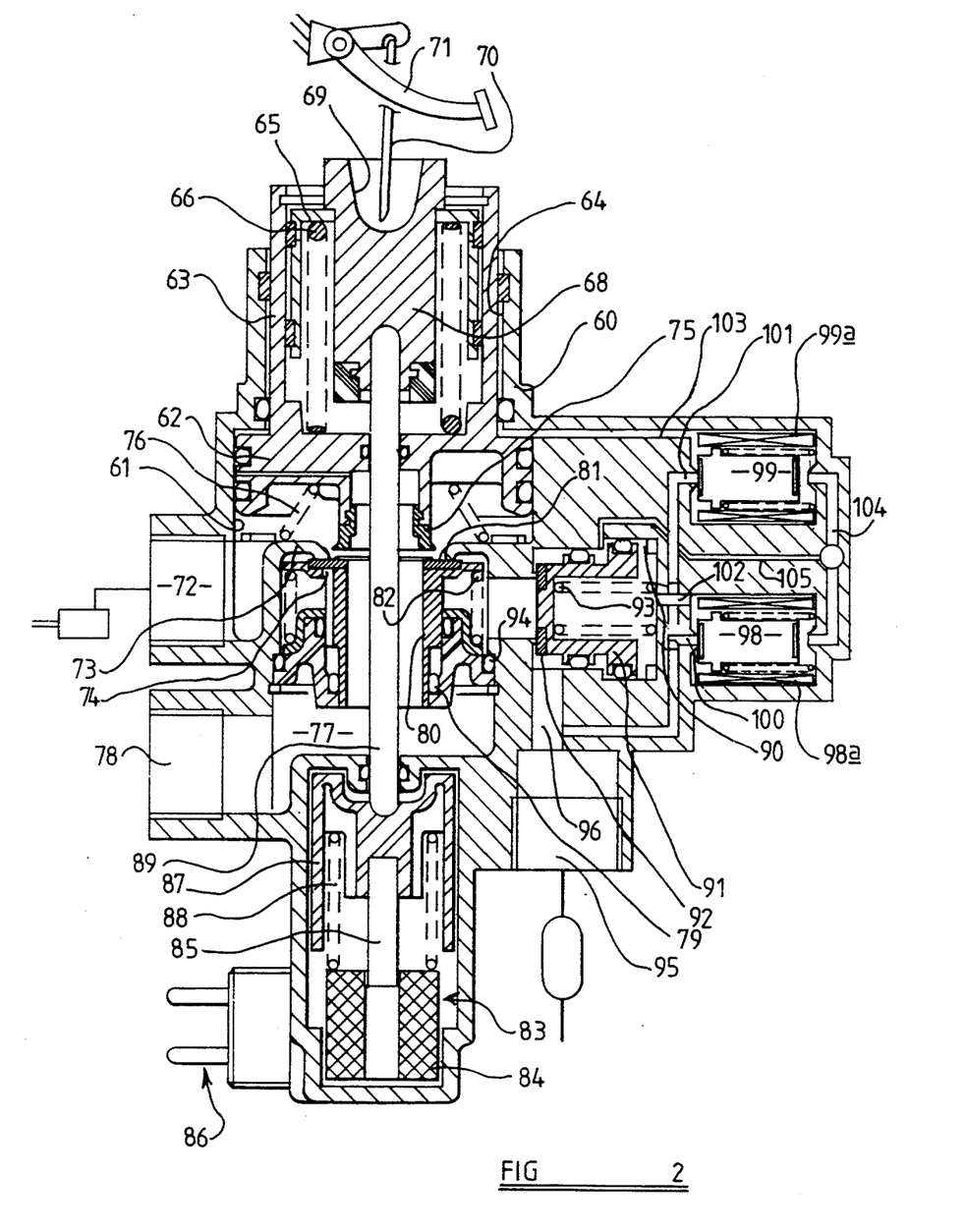
FIG. 2 is a sectioned view of the foot brake valve of the system shown in FIG. 1.

Referring now to FIG. 2 of the drawings, this shows in detail the foot valve 11 of the system. This comprises a body 60 which is in as many parts as necessary to provide for the accommodation and assembly of the following components therein. The body affords a bore 61 in which is slidably received a modulating piston 62 with a hollow upwards extension 63 slidable in an upwardly extending bore 64 of smaller diameter than the bore 61. Within the extension 63 of the modulating piston there is slidably accommodated a cup-shaped member 65 which is spring biased upwardly relative to the modulating piston by a coil spring 66 and is held captive within the extension 63 by a retaining ring 67. An abutment member 68 fits within the member 65 and has a socket 69 at its upper end to receive a push rod 70 operable by the brake pedal of the vehicle indicated diagrammatically at 71. It will be appreciated that seals and guide elements are conventionally provided at the sliding surfaces of the piston 62 and associated components, but such seals and elements are not described in detail herein.

A port 72 in the side of the body of the foot valve communicates with the space in the bore 62 beneath the modulating piston 62. The body includes a portion 73 defining a central aperture 74 of a size sufficient to receive, with a clearance, an annular downward extension 75 of the modulating piston 62. A tapered coil compression spring 76 biases the modulating piston upwardly relative to the body of the foot valve. The port 72 is for connection to an air-operated brake actuator.

Beneath the body portion 73, the body defines a chamber 77 open to an exhaust port 78. Within the chamber 77 there is disposed a guide member 79 which provides vertical guidance for a hollow valve member 80 which at its uppermost end has a valve surface 81 engageable with a seating formed around the aperture 74. The valve member 80 is spring biased upwardly by a compression spring 82 into engagement with the seating around the aperture 74.

Beneath the chamber 77, the body accommodates a position sensor 83 which is an inductive sensor having a coil 84 and a core 85 movable relative thereto to vary the inductance of the coil. An electrical plug and socket connector indicated at 86 provides for electrical connection to the coil 84. The core 85 is carried by a member 87 slidable within the part of the body containing the sensor 83 and spring biased upwardly therein by a spring 88. A push rod 89 extends downwardly from the member 68 and is slidable through the modulating piston to engage the member 87 and thus move the core from movement of the brake pedal 71.

To the side of the components above described in the body 60 of the foot valve, the body affords a stepped bore 90 in which is received a stepped differential piston 91. At its smaller diameter end the differential piston 91 has a valve element 92, and the piston 91 is spring biased by a spring 93 to the left with reference to the drawing so that its valve element 92 closes a passage 94 leading into the space in chamber 77 above the valve guide 79. A port 95 in the body of the foot valve provides for connection to a source of air under pressure, e.g. the reservoir 33 in the system illustrated in FIG. 1, and a passage 96 extends upwardly from the port 95 to supply such air to the smaller diameter end of the stepped bore 90. Thus, when the piston 91 moves against the spring 33 it provides for the supply of air under pressure to the passage 94.

Figure 3:
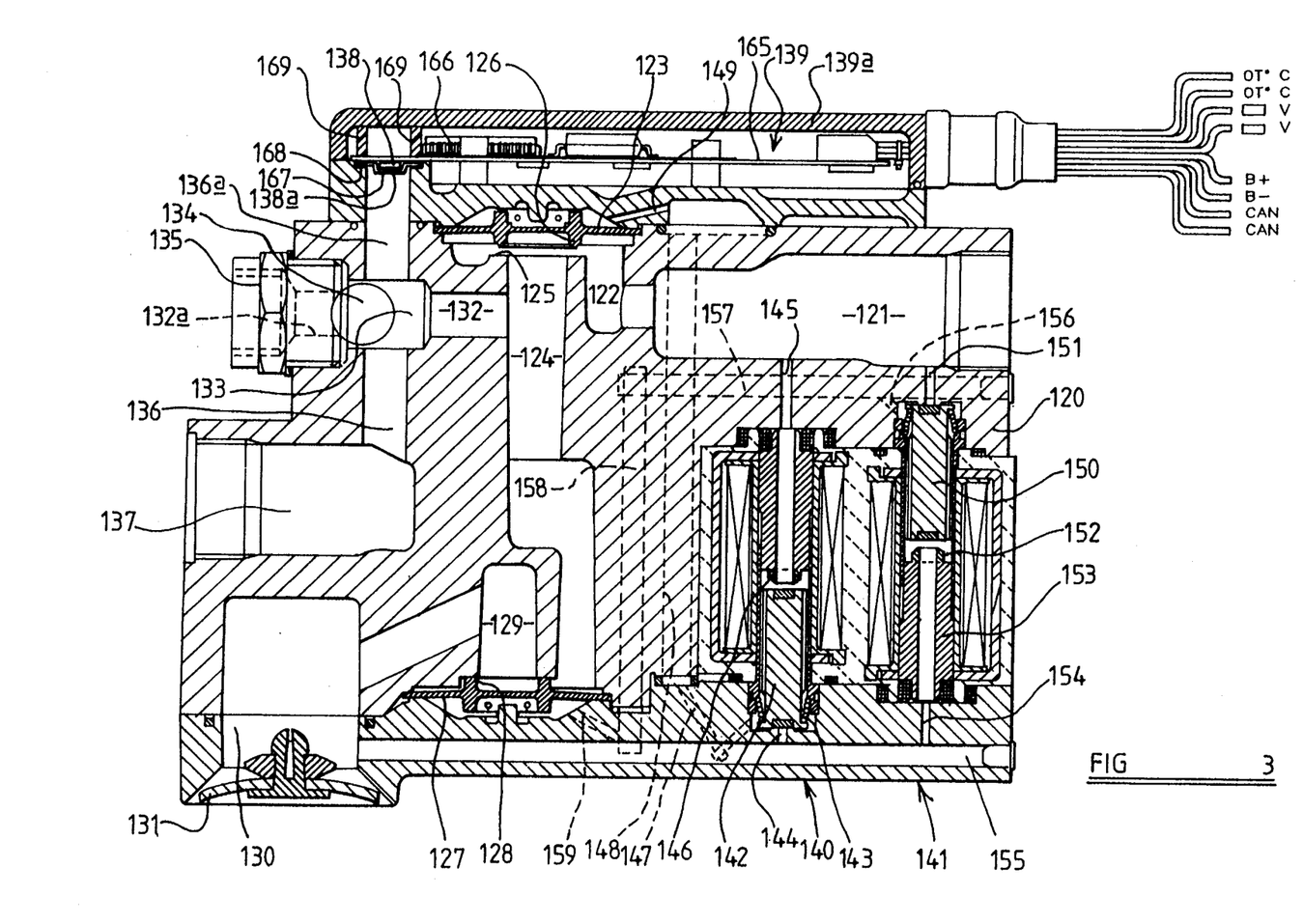
FIG. 3 is a sectioned of a brake valve of the system.

The body 60 further houses two solenoid operated valves whose valve elements are indicated at 98, 99 and whose solenoids are shown diagrammatically at 98a, 99a respectively. Both the valve elements 98, 99 are normally spring biased to the left with reference to FIG. 2 of the drawings so that valve faces at their ends close against respective valve seatings provided at the ends of passages 100, 101 which join one another and communicate with the passage 96 containing, in use, air under pressure. The space within which the valve member 98 is movable communicates, by a passage 102, with the larger diameter end of the stepped bore 90 in which the differential piston 91 is movable. The space within which the valve member 99 is movable communicates, by a passage 103, with the space above the modulating piston 62 but beneath the bore 64. At their opposite ends to those which are engageable with the valve seats surrounding passages 100, 101, the valve members 98, 99 have valve faces engageable with valve seats at the end of a branched passage 104 which communicates, by a passage not shown, with the exhaust port 78 and also communicates, by a passage 105, with the space between sealing formations around the circumference of the two diameters of the differential piston 91. The operation of the above described elements of the foot valve will be described hereafter following the description of one of the EBS valves 12, 13, 14 or 15 of the system, as shown in FIG. 3.

The EBS valve comprises a body 120 which has a port 121 for connection to a supply of air under pressure, namely a reservoir as 37 in the system shown in FIG. 1. The port 121 extends into the body 120 and into a passage 122 which opens upwardly into the space beneath a diaphragm 123. A passage 124 extends downwardly within the body beneath the centre of the diaphragm 123, and the upper end of the passage 124 is surrounded by a seating 125 engageable by an annular valve formation 126 on the underside of the diaphragm 123. The passage 124 extends downwardly to a further diaphragm 127 which has an annular valve formation 128 engageable with a seating surrounding a passage 129 which extends upwardly into the body for a short distance and then downwardly and laterally to open into an exhaust port 130. The exhaust port has within it a flap valve 131.

A lateral passage 132 from the passage 124 leads into a chamber 133 in which is movable from side to side a shuttle valve element 134 which is in the form of a ball. The ball 134 is movable between respective seatings at the end of the passage 132 and in a fitting 135 which provides a second passage 132a and provides an inlet connection for a pipe for back-up air as supplied on line 39 from the foot valve 11 in the system shown in FIG. 1. A passage 136 extends downwardly from the chamber 133 in which the ball 134 is movable, and opens into a port 137 for connection to the air chamber of an air pressure operated brake actuator as indicated at 16 or 17 in the system of FIG. 1. Above the chamber 133 and in a passage 136a in line with the passage 136 there is disposed a pressure transducer 138 which is arranged to produce an electrical signal depending on the air pressure prevailing in the chamber 133 and hence in the brake actuator connected to port 137.

Electronic circuit devices comprising data processing means, (herein referred to as EBS data processing means 139) are disposed in a housing 139a fitted to the body 120, for, for example, processing signals from the sensors for wheel speed and brake temperature as indicated at V and T° C. in FIG. 1, for communicating with the main ECU 10 by the data bus network of the system, for processing pressure signals from the transducer 138 and for controlling the solenoid valves, to be described below, in the EBS valve.

The data processing means comprises a printed circuit board 165 or other mounting means on which are mounted a micro-processor 166 and a transducer 138. In this example the transducer 138 comprises piezo-electric resistive strain gauge circuit device having a surface 138a which is responsive to pressure, the device providing an output signal, proportional to the pressure in the passage 136, which is supplied to the micro-processor 166.

A seal 167 is provided between the printed circuit board 165 and a rebate 168 provided at the upper end of the passage 136. In the present example the seal comprises a flexible membrane which lies over the surface 138a of the transducer to protect the transducer and the printed circuit board from the air in the passage 136 which might contain contaminants. If desired, the seal and protection may be provided in other ways, for example for providing an 0-ring seal between the printed circuit board and the rebate 168 and a protective, pressure transmitting, substance coated on the transducer device 138 and on the associated part of the printed circuit board. Suitable means 169 are provided to hold the printed circuit down firmly to maintain the seal with the rebate 168.

The EBS data processing means provides a local intelligent area network node of the data bus with a pressure feedback loop, wheel speed information and brake temperature input information. The EBS data processing means provides a single channel closed loop pressure control using the above described integral pressure transducer 138.

By integrating the pressure transducer with the printed circuit board and other components of the EBS data processing means, considerable savings in wiring and other component costs is achieved.

Of course, if desired, the signals from all the previously described transducers may be supplied directly to a central ECU and the ECU may send appropriate individual control signals to each valve, but the above described data bus system with a main data processing means provided by the main electronic control unit 10 with EBS data processing means associated with each EBS valve data processing means subordinate to the main data processing means is preferred.

The electronic control means, the EBS data processing means, in the present example, includes processing ability to provide an anti skid (ABS) function for the EBS valve by causing the solenoid valves, hereinafter to be described, to cycle in conventional manner to provide the ABS function.

Although in this example the EBS data processing means is provided in the housing 139a mounted on the associated brake valve 12-15, if desired the EBS data processing means may be provided separately from an associated valve 12-15 but spatially adjacent thereto.

For controlling the application of air under pressure to the brake actuator, the EBS valve incorporates two solenoid operated valves indicated generally at 140, 141. The solenoid valve 140 has a valve element 142 which normally is biased downwardly by a spring 143 so that an exhaust passage 144 is blocked by the valve element whilst communication is established for supply of high pressure air from the port 121 by way of a passage 145 leading downwardly from the port 121, a valve seat 146 from which the valve member 142 is clear, and passage portions 147, 148 and 149 leading to the space above the diaphragm 123. Thus when the solenoid of valve 140 is not energised there is a path for flow of air under pressure to the upper side of diaphragm 123 causing the diaphragm to engage by its valve formation 126 with valve seating 125 to close off the passage 124 from the supply of air under pressure.

Solenoid valve 141 is of the same general configuration as the solenoid valve 140 but is installed differently so that its valve member 150 is normally spring biased upwardly to close a passage 151 leading from the port 121. The opposite end of the valve member 150 is clear of a seating 152 at the end of a hollow member 153 leading into a passage 154 and thence to the exhaust passage 155 communicating with exhaust port 130. When the solenoid of solenoid valve 141 is energised, valve member 150 is drawn downwardly against its spring biasing away from the passage 151 to close the passage 154 and provide for supply of air under pressure, by way of an inclined connecting passage 156, to interconnecting drilled passages 157, 158 and 159 to the space beneath the diaphragm 127. When air under pressure is thus supplied, the diaphragm 127 is displaced so that its valve formation 128 engages the seating surround the opening of passage 129 to close off communication between the passage 124 and the exhaust port 130.

The operation of the EBS valve as shown in FIG. 3 is as follows. When the vehicle's brakes are not required to be applied, the solenoid valves 140, 141 are in the condition in which they are shown in FIG. 3 so that the valve 140 supplies air under pressure from the port 121 to the upper side of diaphragm 123 thereby causing its valve formation 126 to engage seating 125 and thus prevent communication between the passage 122 and the passage 124. At the same time, since the solenoid valve 141 does not permit any air under pressure to be supplied to the underside of diaphragm 127, communication is provided between the passage 124 and the exhaust port 130 by way of the passage 129. When the brake is required to be applied, the coil of the solenoid valve 141 is energised so that the valve member 150 is moved downwardly away from the position in which it closes off the passage 151, so that air under pressure is applied, by way of passages 156, 157, 158, and 159 to the underside of diaphragm 127 so that its valve formation 128 closes off the passage 129. At the same time, the solenoid valve 140 is energised so that its valve member 142 is moved upwardly to close off the passage 145 and open the passage 144. Thus communication is established, by passages 147, 148, and 149, between the space above the diaphragm 123 and the exhaust port 130 by way of exhaust passage 155, so that the diaphragm 123 can move upwardly away from the seating 125. Thus communication is established for flow of high pressure air from the port 121 by way of passage 122, passage 124, opening 132, chamber 133 and passage 136 to the port 137 leading to the brake actuator. Air entering chamber 133 by way of opening 132 causes the ball 134 to engage the seating associated with the fitting 135 and close off this fitting. Pressure transducer 138 gives a signal which represents the pressure of air applied to the brake actuator to the EBS data processing means 139 to provide a closed loop pressure control modulation of the brake instructing signal from the ECU 10. The resultant signal thus obtained is used to control the operation of the solenoid valves 140, 141 so that the pressure applied to the brake actuator is that which is desired to achieve the required level of braking.

The foot valve 11 has three modes of operation. The mode of operation which exists in normal use is that in which the braking of the vehicle is entirely electronically controlled. In this mode, the solenoid valve coil 98a which operates on valve member 98 in the foot valve is energised, which causes the valve member 98 to clear the passage 100 and thus allow air under pressure, supplied to the foot valve at port 95, to be admitted by way of passages 100, 102 to the right hand side of the differential piston 91. Since such air under pressure acts on a greater area of the piston 91 than that which has access to the opposite side of the piston by way of passage 96, the piston 91 stays in the position illustrated in FIG. 2, preventing access of air under pressure to the passage 94. Movement of brake pedal 71 is transmitted via push rod 70, member 68, and operating rod 89 to the inductive sensor 83. The electrical signal, namely the value of the inductance of the coil 84 of the sensor varying in accordance with the position of the core 85 relative thereto, is communicated electrically on line 45 to the main ECU 10. The required level of braking thus set by the driver is converted by the ECU to an instructing signal representing required brake application pressure, and the signal is transmitted to the EBS valves which operate as above described to apply the required air pressure to the brake actuators.

It will be appreciated that during braking wheel, speed at each wheel, brake temperature, vehicle load, and any other desired parameters are being monitored by the various sensors provided in the system, and processing is being performed by the ECU 10 to send signals to the EBS valves at the wheels to cause the EBS valves to apply the required air pressure to their associated brake actuators. For example, incipient locking of a wheel may be detected from the wheel speed signals derived from that wheel, which will cause the braking effort at that wheel to be adjusted to prevent locking.

If there should be any failure of the electronic system, both solenoid valves of the foot valve are de-energised and their valve members 98, 99 are in the position shown. In this condition, no air under pressure can reach the space to the right-hand side of the differential piston 91: instead this space is exhausted by way of passages 102, 104, to the exhaust port 78. Air under pressure is still applied to the left-hand side of the differential piston, however, so that such piston is moved to the right opening the path for flow of air to the passage 94 and the space above the valve guide 79.

In this condition, operation of brake pedal 71 by the driver of the vehicle will cause downward displacement of member 68 and compression of spring 66 until the force exerted by spring 76 is exceeded, whereupon the modulating piston 62 moves downwardly until its downward annular extension 75 enters the aperture 74 and contacts the valve member 80 to displace it downwardly, against the force exerted by spring 82, to clear the valve seat 81. At the same time the engagement of the extension 25 with the valve member 80 prevents access to the exhaust port 78. Air under pressure from passage 94 is then able to pass through the aperture 74 as the valve 80 moves away from the seating surrounding such aperture, to reach port 72 which, with reference to FIG. 1, is connected by line 39 to the EBS valves. The foot valve then functions as a standard pneumatic foot brake operating valve, in which the pressure of air it supplies is determined by the balance between the compression of spring 66 and the force exerted thereby on the modulating piston 62, and the force of spring 76 and the pressure of air beneath the modulating piston. Together these control valve member 80 so that the required air pressure is supplied from the foot valve through port 72. When pressure is removed from the brake pedal, valve member 80 moves upwardly to engage seating around aperture 74, and when the extension 75 lifts from the valve member air is released to the chamber 77 and exhaust port 78 through the centre of the hollow valve member 80.

At each EBS valve, the pipe which brings air thus supplied from the foot valve is connected to the fitting 135. Such air causes the shuttle valve element in the form of ball 134 to be driven across the chamber 133 to contact the seating where the passage 132 enters the chamber 133. Thus such air is communicated directly to the chamber of the brake actuator by way of passage 136 and port 137, and is isolated from the parts of the EBS valve which are involved in the electronically controlled braking operation thereof.

The foot valve further provides a testing function, which, in the present example, is carried out every time the "ignition" of the vehicle is switched on prior to start-up of the vehicle's engine. In this function, the solenoid 98a which moves the valve member 98 in the foot valve is not energised but the solenoid 99a which moves the valve member 99 in the foot valve is energised to move the valve member 99 to the right. This causes the valve member 99 to uncover the entrance of passage 101 and permit air under pressure to be supplied by way of passage 103 to the peripheral annular space above the modulating piston 62. This causes the modulating piston 62 to move downwardly until the valve member 80 is contacted and moved downwardly to permit air under pressure to pass to the port 72 and thence to be supplied to the EBS valves. The dimensions of the modulating piston are designed so that the ratio between its areas beneath it and above it is of the order of 6:1, so that the pressure of air supplied to the EBS valves in this testing mode of operation is substantially less than that which would cause a full pressure brake application.

The air thus supplied to each EBS valve causes, as above described, the displacement of ball valve member 134 thereof so that the air is applied to the brake actuator by way of passage 136. The pressure of air in passage 136 is detected by the transducer 138, and this provides a check signal which indicates that the test has been satisfactorily performed. The signals from all the EBS valves are transmitted back to the ECU 10, and if all are satisfactory normal electronically controlled brake operation can continue as above described.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

I claim:

1. A braking system comprising means operable by a driver of a vehicle and having a means for providing an electrical braking demand signal; electronic control means responsive to said braking demand signal, and brake valve means responsive to an instructing signal supplied to the brake valve means by the electronic control means and arranged to control supply of fluid under pressure from a source thereof to at least one actuator means for brake application wherein the brake valve means comprises a plurality of brake valves arranged to control the supply of fluid under pressure to a respective brake actuating means for a wheel of the vehicle, the driver operable means of the system includes, as well as said means for providing said electrical braking demand signal, means for supplying fluid under pressure to the brake valve means of the system, and each brake valve includes pressure sensing means to supply a signal responsive to the pressure of fluid supplied to the associated brake actuator means; electrically operable valve means for controlling the supply of fluid under pressure from the source to the actuator means; and the electronic control means receiving the signal supplied by the pressure sensing means being arranged to control said electrically operable valve means so that said pressure is in accordance with the instructing signal, and wherein said electronic control means comprises a main data processing means and local EBS data processing means for each brake valve, the main data processing means receiving the brake demand signal from the driver operable means and transmitting said instructing signal to each EBS data processing means, each EBS data processing means receiving the signal supplied by the associated pressure sensing means and being arranged to effect said control of said electrically operated valve means so that said pressure is in accordance with the instructing signal, wherein each brake valve, in addition to providing a supply of fluid under pressure from the source thereof to the associated brake actuator means under the control of the electrically operable valve means also has an inlet for fluid under pressure to be supplied directly to the associated brake actuator means.

2. A braking system according to claim 1 wherein the EBS data processing means of the brake valves are connected in a databus network with the main data processing means of the system.

3. A braking system according to claim 1 wherein each brake valve has a blocking valve member, operable automatically in response to fluid pressure so as to assume either a first position in which it opens a first passage for supply of fluid by way of the electrically operable valve means to brake actuator means and closes a second passage from said inlet for supply of fluid and a second condition in which it closes the first passage and opens the second passage and the pressure sensing means of the brake valve is positioned so as to detect the pressure of fluid supplied to the brake actuator means whichever position the blocking valve member is in.

4. A braking system according to claim 3 wherein fluid under pressure supplied from the driver operable means is directed by the blocking valve member directly to a respective brake actuator.

5. A braking system according to claim 1 wherein the driver operable means further includes means for supplying fluid under pressure directly to brake valve means in response to an electrical signal which constitutes a test signal.

6. A braking system according to claim 5 wherein the electrical test signal is provided by the electronic control means.

7. A braking system according to claim 5 wherein the pressure of the fluid thus supplied to brake valves in response to the test signal is detected by a pressure sensing means thereof, which provides signals to the electronic control means as an indication of satisfactory test result.

8. A braking system according to claim 7 wherein means is provided to cause the electronic control means to provide such a test signal each time electrical circuits of the vehicle are activated after a period of non-use.

9. A braking system according to claim 1 wherein, in addition to the braking demand signal provided by the driver operable means, the electronic control means is responsive to signals provided by additional sensors detecting other operating parameters associated with the vehicle.

10. A braking system according to claim 9 wherein the additional sensors sense wheel speed and an antilocking function is provided.

11. A braking system according to claim 9 wherein electrical signals from at least one of said additional sensors are applied to one of the EBS data processing means and thence communicated to the main data processing means.

12. A braking system according to claim 9 wherein further sensors are provided to sense further parameters and electrical signals from said further sensors are applied to at least one of
  a) one of the EBS data processing means, and
  b) the main data processing means.

13. A braking system according to claim 1 wherein the pressure sensing means is mounted on a printed circuit board disposed at one of said brake valves, and on which one of said EBS data processing means is mounted.

14. A braking system according to claim 13 wherein a seal is provided between said fluid supplied to the brake actuator means and at least one of the pressure sensing means and the mounting means and the pressure sensing means.

15. A braking system according to claim 14 wherein the seal comprises a membrane disposed between the mounting means and a wall of a passage for said air and extending over the pressure sensing means.

16. A braking system according to claim 1 wherein each brake valve comprises a relay valve.

17. A brake valve for an electronically controlled braking system comprising a first inlet for fluid under pressure from a source thereof; an outlet for supplying fluid to at least one brake actuator means; electrically operable valve means for controlling delivery of the fluid from said first inlet to said outlet; a second inlet for receiving fluid from a source thereof and arranged to deliver such fluid direct to said outlet, bi-passing said electrically operated valve means and pressure sensing means responsive to the pressure of fluid delivered to said outlet irrespective of the source of such fluid, wherein a blocking valve member is provided, operable automatically in response to fluid pressure so as to assume either a first position in which it opens a first passage for supply of fluid from the first inlet by way of the electrically operable valve means to the brake actuator means and closes a second passage from said second inlet for said direct supply of fluid and a second condition in which it closes the first passage and opens the second passage and said pressure sensing means being disposed in a chamber which is in communication with said outlet.

18. A brake valve according to claim 17 wherein the blocking valve member is movable in a chamber which, at opposite ends of the chamber, is in communication with the first and second passages and which, between said ends of the chamber, is in communication with a third passage connected to the outlet and with a fourth passage connected to said chamber in which the pressure sensing means is disposed.

* * * * *